United States Patent
Konno (10) Patent No.: US 7,852,194 B2
(45) Date of Patent: Dec. 14, 2010

(54) VEHICLE ELECTRONIC KEY SYSTEM

(75) Inventor: Takeshi Konno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 853 days.

(21) Appl. No.: 11/408,945

(22) Filed: Apr. 24, 2006

(65) Prior Publication Data

US 2006/0238296 A1    Oct. 26, 2006

(30) Foreign Application Priority Data

Apr. 26, 2005    (JP) .............................. 2005-128355

(51) Int. Cl.
G05B 23/02   (2006.01)
G05B 19/00   (2006.01)
G05B 23/00   (2006.01)
B60R 25/10   (2006.01)
G08C 19/00   (2006.01)
H04M 1/00    (2006.01)

(52) U.S. Cl. .............. 340/3.7; 340/825.72; 340/426.17; 340/5.61; 455/562.1

(58) Field of Classification Search ............ 340/825.72, 340/426.17, 5.61, 5.6, 5.32, 5.3, 5.2, 5.1, 340/825.29, 3.9, 3.7, 3.24, 2.2, 2.1, 825.01, 340/825.1, 10.1, 10.3, 426.35, 426.36; 455/562.1
See application file for complete search history.

(56) References Cited

U.S. PATENT DOCUMENTS

| | | | | |
|---|---|---|---|---|
| 4,992,775 A * | 2/1991 | Castle et al. | ................ | 340/525 |
| 7,042,342 B2 * | 5/2006 | Luo et al. | .............. | 340/426.17 |
| 7,209,030 B2 * | 4/2007 | Nolan et al. | ........... | 340/426.36 |
| 7,471,187 B2 * | 12/2008 | Nakashima et al. | ........ | 340/5.61 |
| 2005/0134477 A1 * | 6/2005 | Ghabra et al. | .......... | 340/825.72 |
| 2006/0046784 A1 * | 3/2006 | Chen et al. | ............... | 455/562.1 |
| 2006/0077035 A1 * | 4/2006 | Mamaloukas | .............. | 340/5.61 |

FOREIGN PATENT DOCUMENTS

| | | | |
|---|---|---|---|
| JP | 2001-12123 A | | 1/2001 |
| JP | 2001-349117 A | | 12/2001 |
| JP | 2004-27490 A | | 1/2004 |
| JP | 2004-114860 A | | 4/2004 |
| JP | 2004-128735 A | | 4/2004 |
| JP | 2004-308165 A | | 11/2004 |
| JP | 2004-356798 A | | 12/2004 |
| JP | 2006-89946 A | | 4/2006 |

\* cited by examiner

Primary Examiner—Benjamin C Lee
Assistant Examiner—Andrew Bee
(74) Attorney, Agent, or Firm—Birch, Stewart, Kolasch & Birch, LLP (57) ABSTRACT

To ensure a perform authentication based on a request signal Sr which is the authorized radio signal even under a bad radio environment in which radio noise comes continuously. A portable device receives a request signal Sr transmitted from a vehicle-mounted device and transmits an answer signal including a receiving-sensitivity changing switch for changing a receiving sensitivity of a receiving circuit which receives the request signal Sr. As a result, even if the authentication cannot be carried out with normal receiving sensitivity due to the influence of the continuous radio noise, by changing the receiving sensitivity to low sensitivity, and by bringing the portable device physically close to a transmission source of the request signal which is the authorized radio signal, it is possible to dramatically increase the probability that the authentication based on the authorized radio signal can be carried out.

20 Claims, 6 Drawing Sheets

VEHICLE ELECTRONIC KEY SYSTEM

CROSS-REFERENCE TO RELATED APPLICATIONS

The present application claims priority under 35 USC 119 to Japanese Patent Application No. 2005-128355 filed on Apr. 26, 2005 the entire contents of which are hereby incorporated by reference.

FIELD OF THE INVENTION

The present invention relates to a vehicle electronic key system which performs mutual radio communication between a portable device (an electronic key) carried by a user and a vehicle-mounted device to verify an ID (an identification code) of the portable device. If the vehicle-mounted device determines that the request is from a authorized portable device, the vehicle mounted device enables an engine of a vehicle or the like to be started or the like. For example, the present invention relates to a vehicle electronic key system suitable to be implemented in a motorcycle.

DESCRIPTION OF THE BACKGROUND ART

In a vehicle electronic key system, an activation means (a switch) is installed in a door handle and/or a trunk lid of a four-wheeled vehicle or the like. When a user operates (activates) the activation means, the communication between the activation means and a portable device is started, the verification between an ID transmitted from the portable device and an ID registered in a vehicle-mounted device is performed, and a door lock or the like is released at the stage when the result of the verification showing the correspondence between the IDs is obtained. See, for example, Japanese Patent Laid-Open No. 2001-349117, paragraphs [0026] to [0028].

Japanese Patent Laid-Open No. 2001-349117 discloses an activation means (a switch) that is installed in an ignition knob. Once the user operates the ignition knob after getting in the four-wheeled vehicle, the communication between the activation means and the portable device is performed again to carry out the ID verification for the purpose of permitting the engine to be started. In addition, Japanese Patent Laid-Open No. 2001-349117 describes an engine that is started at the stage when the result of the verification showing the correspondence between the IDs is obtained.

In other words, with regard to the conventional vehicle electronic key systems for four-wheeled vehicles, the presence of an authorized portable device is a necessary requirement for unlocking a door and starting the engine.

As a vehicle electronic key system implemented in a motorcycle, a system has been proposed which discloses that the system generates a random number on the basis of the time (start time data) from when an immobiliser is turned on to the time when an engine is started, generates an authentication key and an authentication code by encrypting unique information of a key on the basis of the random number, and performs authentication with the use of the authentication key and the authentication code. The system is designed to prevent theft. See the abstract of Japanese Patent Laid-Open No. 2001-12123.

As a vehicle electronic key system implemented in a motorcycle or the like, a system has been proposed, which reduces the probability of loss of a portable device by illuminating a warning light if a user dropped the portable device while a vehicle is stopped, or running. See the abstract of Japanese Patent Laid-Open No. 2004-114860.

With regard to vehicle electronic key systems, a portable device may be activated by a request signal which is the authorized radio signal from a vehicle, and performs an authentication operation. However, it is possible that the portable device is activated successively by radio noise other than the authorized radio signal.

If the activation is performed by continuous radio noise, it comes to be difficult to start the authentication based on the request signal. As a result, it is possible to conceive that it can take a long time to unlock a main switch knob or the like of the vehicle to switch to an engine starting position.

Broadcasting facilities, power plants, power supply devices, unnecessary radiation emitted from cables connected thereto, and the like are noise sources that generate radio noise continuously.

SUMMARY AND OBJECTS OF THE INVENTION

The present invention has been made in consideration of such problems. An object of the present invention is to provide a vehicle electronic key system which makes it possible to perform authentication between a portable device and a vehicle-mounted device on the basis of a request signal which is the authorized radio signal even under a bad radio environment in which radio noise is continuous.

A vehicle electronic key system according to an embodiment of the present invention is a vehicle electronic key system having a vehicle-mounted device, and a portable device that receives a request signal transmitted from the vehicle-mounted device for transmitting an answer signal. The portable device includes a receiving circuit for receiving the request signal, a receiving-sensitivity changing switch and receiving-sensitivity changing control means for changing receiving sensitivity of the receiving circuit on the basis of the operation of the receiving-sensitivity changing switch.

As a result, even if authentication cannot be carried out with normal receiving sensitivity due to the influence of the continuous radio noise, by operating the receiving-sensitivity changing switch to thereby change the receiving sensitivity of the portable device to low sensitivity, for example, and by bringing the portable device physically close to a transmission source (included in the vehicle-mounted device) of the request signal which is the authorized radio signal, the signal to noise ratio is increased. Accordingly, the probability increases dramatically that the authentication based on the request signal that is the authorized radio signal can be carried out.

In other words, with the present invention, it is made possible to surely perform authentication between the portable device and the vehicle-mounted device on the basis of the request signal that is the authorized radio signal even under a bad radio environment in which radio noise is continuous.

The receiving sensitivity is changed by changing the gain of the receiving circuit steplessly, or by changing the gain stepwise. Considering operational convenience, it is preferable to make it possible to change the receiving sensitivity stepwise. With regard to motorcycles, for example, when normal receiving sensitivity (high receiving sensitivity) corresponds to a range of 0.8 m from the position of the request signal generation source of the vehicle-mounted device, the receiving sensitivity in the case of low receiving sensitivity corresponds to a range of 0.1 to 0.5 m, for example. The request signal generation source of the vehicle-mounted device refers to the position of the vehicle-mounted antenna.

It is preferable in view of the operability that this antenna is disposed near the main switch knob that functions as a trigger-operation device for generating the requested signal.

With regard to changing the receiving sensitivity, instead of changing the gain, a low sensitivity receiving circuit and a high sensitivity receiving circuit may be provided to change the receiving sensitivity by switching between these circuits. In this case, it is possible to change the receiving sensitivity by changing the values of L and C constituting (the tuning circuits of) the antennas. Since the level of the radio noise received by the antennas may be low, it is possible to ensure an increase with respect to the signal to noise ratio as compared to the case where the gain is changed. It is also possible to use the change of the gain at the same time.

If the current receiving sensitivity resulting from the switching operation of the receiving-sensitivity changing switch is indicated by a receiving-sensitivity indicator, the user of the portable device can easily see (check) whether the current receiving sensitivity is high sensitivity or low sensitivity.

In addition, based on an output signal of the receiving circuit, if the reception possibility determination means for determining whether the situation is such that it is impossible to receive the request signal from an output signal of the receiving circuit, and a reception impossible state indicator which indicates the situation in which it is impossible to receive the request signal, are provided, the user of the portable device can recognize timing to operate the receiving-sensitivity changing switch more clearly. Even if the state in which reception cannot be carried out lasts for a certain period of time, by allowing the reception impossible state indicator to blink for a certain period of time, it is possible to save power consumption of the portable device. From the viewpoint of saving power consumption, it is preferable that the duty ratio of the blinking be 50% or less.

It should be noted that it is possible to make the receiving-sensitivity indicator also serve as the reception impossible state indicator. In the case where the status is such that it is impossible to receive the request signal, for example, if the receiving-sensitivity indicator is allowed to blink, the user of the portable device can recognize timing to operate the receiving-sensitivity changing switch.

With the present invention, it is possible to perform an authentication between the portable device and the vehicle-mounted device on the basis of the request signal which is the authorized radio signal even under a bad radio environment in which radio noise is continuous.

In addition, with the present invention, even under a bad radio environment in which radio noise is continuous, the effect that it is possible to unlock the main switch knob or the like of the vehicle to switch to an engine startable position, thus starting the engine, can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following description sets forth an example of an electronic key system for a motorcycle in which the vehicle electronic key system according to the present invention is implemented.

Figure 1:
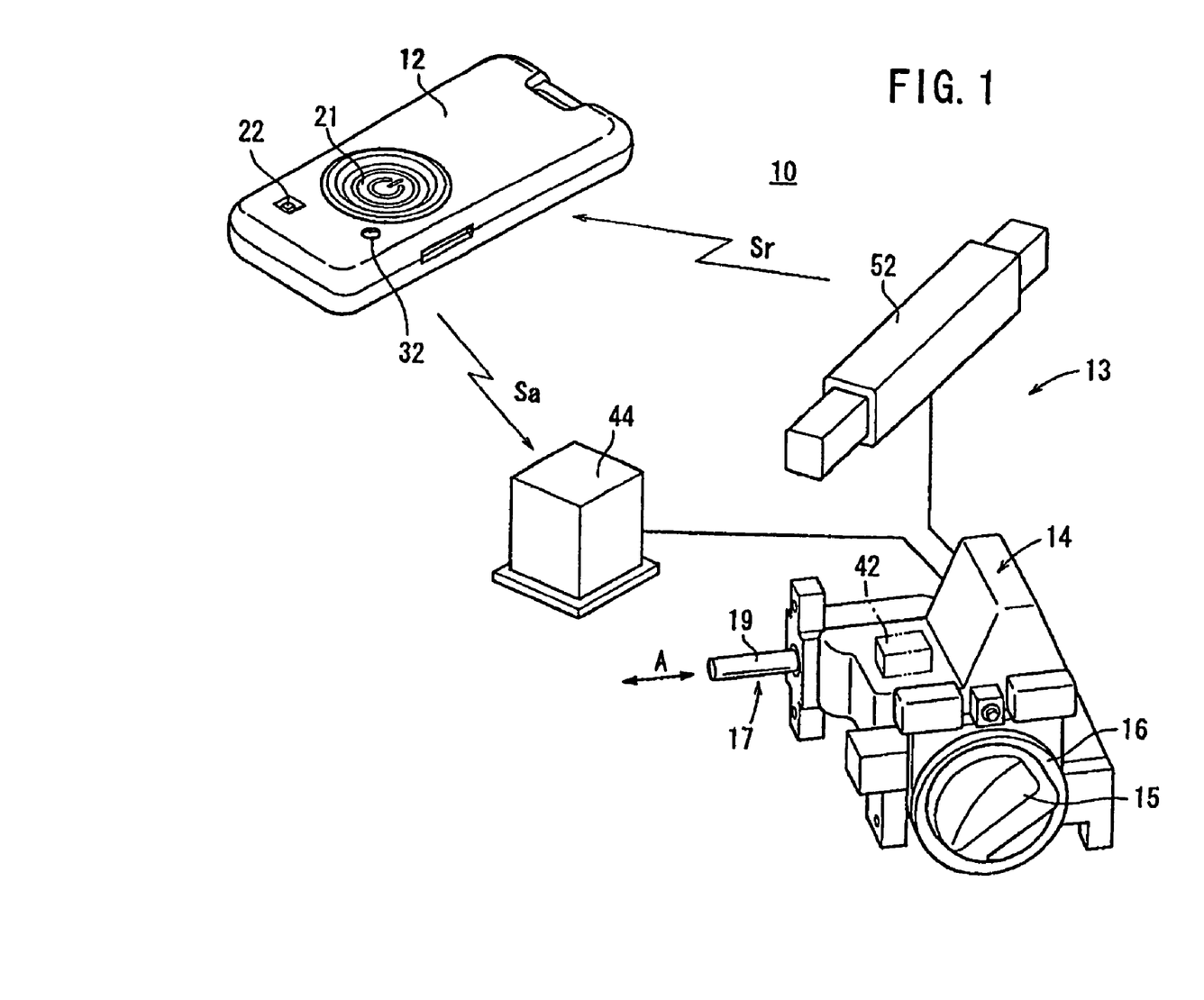
FIG. 1 is a schematic configuration diagram showing a vehicle electronic key system according to an embodiment.

FIG. 1 is a schematic configuration diagram of the vehicle electronic key system 10 according to this embodiment. As seen from FIG. 1, the vehicle electronic key system 10 basically includes a portable device (an electronic key) 12 carried by a user and a vehicle-mounted device 13 including a handle lock module 14 that is mounted on a vehicle.

The handle lock module 14 has an ECU (Electronic Control Unit) 42 which is a controller, a main switch 16 provided with a main switch knob 15, and a handle lock mechanism 17, which are integrally disposed. In addition, an UHF (Ultra High Frequency) receiving unit 44, and an LF (Low Frequency) transmitting antenna 52 are connected with each other via wiring inside the vehicle. In this embodiment, the handle lock module 14, the UHF receiving unit 44, and the LF transmitting antenna 52 constitute the vehicle-mounted device 13 of the vehicle electronic key system 10.

As shown in FIG. 1, the portable device 12 is implemented as the so-called smart card system wherein the external shape is a card shape with an IC chip being embedded therein. The portable device 12 may be changed to have an external shape which is a key shape with an IC chip being embedded therein.

The handle lock mechanism 17 constituting the handle lock module 14 is provided with a lock pin 19 that is reciprocated (to project from the body of the handle lock module 14, or to be retracted into the body) by a built-in actuator 50 (to be described later) in an arrow A direction.

Figure 2:
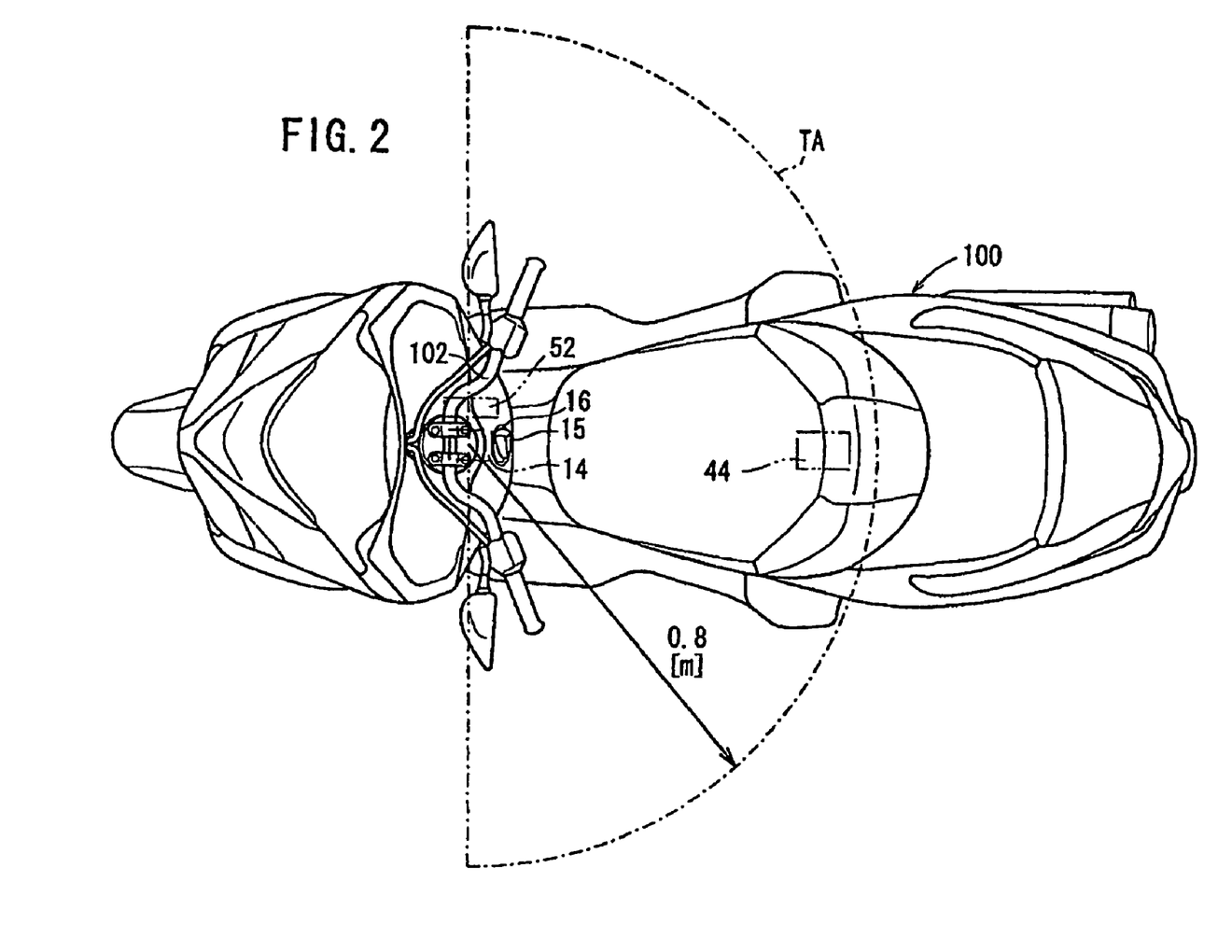
FIG. 2 is a plan view of a vehicle in which the vehicle electronic key system is implemented.

FIG. 2 shows a plan view of the vehicle 100 that is the motorcycle in which the vehicle-mounted device 13 including the handle lock module 14 is incorporated.

As shown in FIG. 2, the handle lock module 14 is fixed so that only the main switch knob 15 and a panel portion of the main switch 16 are exposed on a console area of the vehicle 100.

The lock pin 19 of the handle lock mechanism 17 (see FIG. 1) locks a rotation shaft (a handle post) of a handlebar 102 via a not-shown cylinder when projecting from the body, or allows the cylinder to be rotated, thus freeing the rotation shaft of the handlebar 102 coupled to this cylinder, when retracted into the body.

The LF transmitting antenna 52, for transmitting a request signal Sr that is an LF signal, is fixed near the handle lock module 14, so that the LF transmitting antenna 52 is fixedly disposed near the main switch knob 15 that is operated by a user. Such an arrangement can be matched with a feeling of the user who believes that the authorized radio signal (the request signal Sr) is generated near the main switch knob 15.

The UHF receiving unit 44 includes a receiving antenna 54 (to be described later) that receives an answer signal Sa that is a UHF signal from the portable device 12. The UHF receiving unit 44 is fixed under a seat of the vehicle 100. By this fixed disposition, the portable device 12 will be within the coverage of the UHF receiving unit 44 when the user (the driver of the vehicle 100) carrying the portable device 12 straddles the seat.

Figure 3:
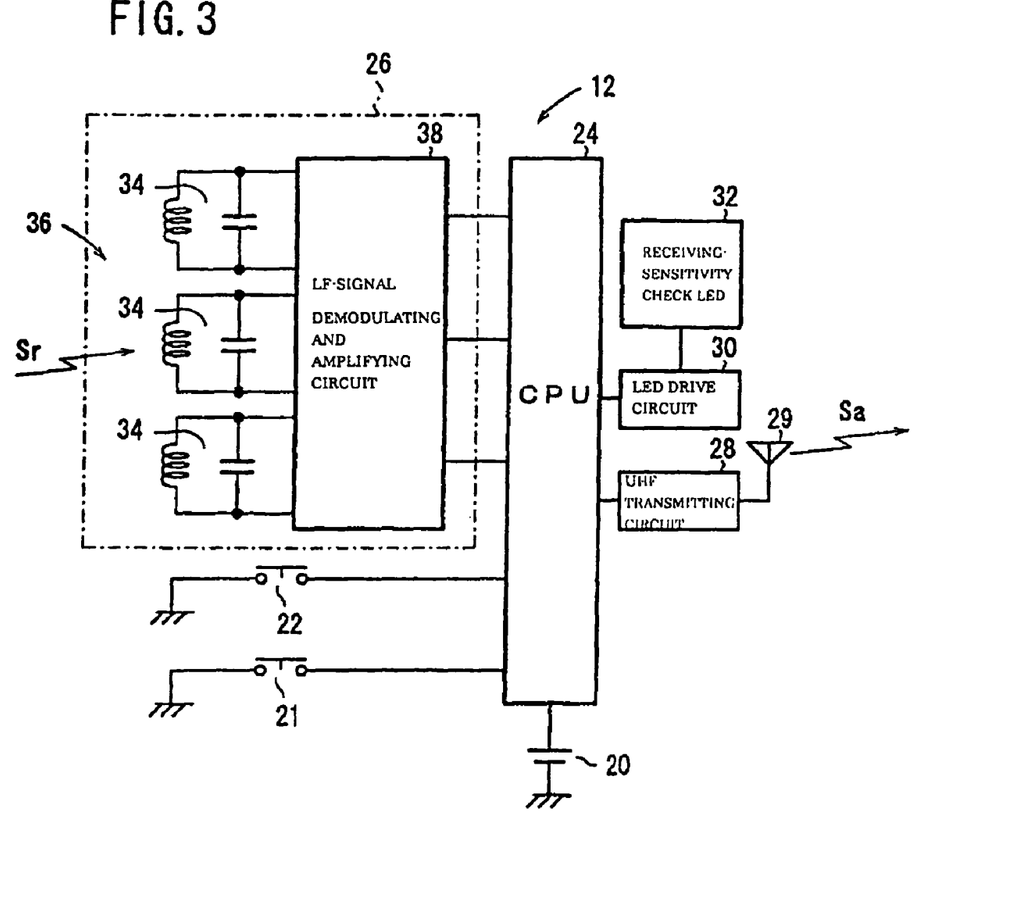
FIG. 3 is a block diagram showing a configuration of a portable device.

FIG. 3 shows a block diagram of the portable device 12. As shown in FIG. 3, the portable device 12 includes a battery 20 which is a mounted battery, such as a button battery, a CPU 24 which works as a variety of predetermined functional means, such as receiving-sensitivity changing control means, reception possibility determination means, by executing various programs stored in a ROM (not shown), a receiving circuit 26 for receiving the request signal Sr, a card-key on/off switch 21, a receiving-sensitivity changing switch 22, a transmitting circuit 28 for transmitting the UHF signal, a transmitting antenna 29 for transmitting the answer signal Sa which is a UHF signal, an LED (Light Emitting Diode) drive circuit 30 and an LED 32 which serves as a receiving-sensitivity check indicator or the like.

The receiving circuit 26 includes an XYZ, three-axis receiving antenna 36 formed of LC tuning circuits 34 and an LF-signal demodulating and amplifying circuit 38. The receiving circuit 26 receives the request signal Sr transmitted from the LF transmitting antenna 52 of the vehicle-mounted device 13 through the receiving antenna 36, amplifies and then demodulates the signal via the LF-signal demodulating and amplifying circuit 38. The demodulated request signal Sr is supplied to the CPU 24. The frequency of the carrier wave (the LF frequency) of the request signal Sr is from 100 to 300 kHz.

The CPU 24 sets the receiving sensitivity of the receiving circuit 26 at high sensitivity in a normal state, that is, in a default state. In this state, the CPU 24 illuminates the LED 32 in green, which serves as the receiving-sensitivity indicator, for a predetermined period of time via the LED drive circuit 30 when detecting that the receiving-sensitivity changing switch 22 is pushed for a period of time less than one second (in other words, short pushing). This green lighting enables the user to see the high sensitivity state. The CPU 24 performs control so as not to change the receiving sensitivity in the case of the short pushing. The receiving-sensitivity changing switch 22 may be connected to the LF-signal demodulating and amplifying circuit 38.

As shown in FIG. 1, the portable device 12 is provided with the card-key on/off switch 21 for switching on/off the smart card key system in addition to the receiving-sensitivity changing switch 22. In this description of the embodiment, it is assumed that the smart card key system is in an on state.

When the receiving sensitivity is in the high sensitivity state, the CPU 24 makes the gain of the LF-signal demodulating and amplifying circuit 38 small when detecting that the receiving-sensitivity changing switch 22 is pushed by a user for a period of time equal to or longer than one second (in other words, long pushing). As a result, the state of the receiving sensitivity of the receiving circuit 26 is changed from the high sensitivity state to a low sensitivity state. When the long pushing is detected, the CPU 24 illuminates the LED 32 in red, which serves as the receiving-sensitivity indicator, for a predetermined period of time via the LED drive circuit 30, so that the user can recognize that the state of the receiving sensitivity has reached the low sensitivity state.

In this state, the CPU 24 illuminates the LED 32 in red, which serves as the receiving-sensitivity indicator, for a predetermined period of time via the LED drive circuit 30 when detecting that the receiving-sensitivity changing switch 22 is subjected to short pushing. This red lighting enables the user to recognize that the receiving sensitivity is in the low sensitivity state.

When the receiving sensitivity is in the low sensitivity state, the CPU 24 makes the gain of the LF-signal demodulating and amplifying circuit 38 large (restores the gain to that in the normal state) when detecting that the receiving-sensitivity changing switch 22 is subjected to long pushing. As a result, the state of the receiving sensitivity is changed from the low sensitivity state to the normal, high sensitivity state, and the LED 32 is illuminated in green for a predetermined period of time. Also in this state, the CPU 24 illuminates the LED 32 in green, which serves as the receiving-sensitivity indicator, for a predetermined period of time via the LED drive circuit 30 when detecting that the receiving-sensitivity changing switch 22 is subjected to short pushing. This green lighting enables the user to recognize that the receiving sensitivity is in the high sensitivity state.

As schematically shown in FIG. 2, when the receiving sensitivity of the receiving circuit 26 is set in the high sensitivity state, the range TA of communication of the request signal Sr with the portable device 12, which signal is the authorized radio signal transmitted from the LF transmitting antenna 52, is within 0.8 m (the height is in a range of 0.7 to 1.3 m) from the main switching knob 15 (the LF transmitting antenna 52). Accordingly, the communication range TA has a range to be fully included in the communication range (this is a wide communication range TA) when the user carrying the portable device 12 straddles the seat of the vehicle 100. On the other hand, although it is not shown because of a complication, the communication range given when the state of the receiving sensitivity has been changed to the low sensitivity state (this is a narrow communication range) is set so as to be a narrow range within 0.1 to 0.5 m from the main switch knob 15 (the LF transmitting antenna 52).

Thus, in order to enable the authentication communication between the vehicle-mounted device 13 and the portable device 12 in the case of the narrow communication range, the user has to bring the portable device 12 close to the main switch knob 15.

It should be noted that the communication range within which the transmission and reception of the answer signal Sa, which is the UHF signal communicated between the portable device 12 carried by the user and the UHF receiving unit 44 fixed, under the seat of the vehicle 100 (the position can be considered to be substantially the center of the vehicle 100), can be carried out, is within several meters (2.5 m in this embodiment), which can cover a wide communication range TA of the LF signal.

Referring back to FIG. 3, the CPU 24 of the portable device 12 verifies whether the signal provided from the receiving circuit 26 is the request signal Sr, and, if the signal is the request signal Sr, the CPU 24 reads out an ID data stored in the ROM, adds an attribute indicating the answer to the ID data, and then outputs the resultant as the transmission data Dt to the UHF transmitting circuit 28.

The UHF transmitting circuit 28 modulates a carrier wave according to the transmission data Dt provided from the CPU 24, and transmits the resultant as an answer signal Sa via the transmitting antenna 29. The frequency of the carrier wave of the answer signal Sa is from 200 to 500 MHz.

Figure 4:
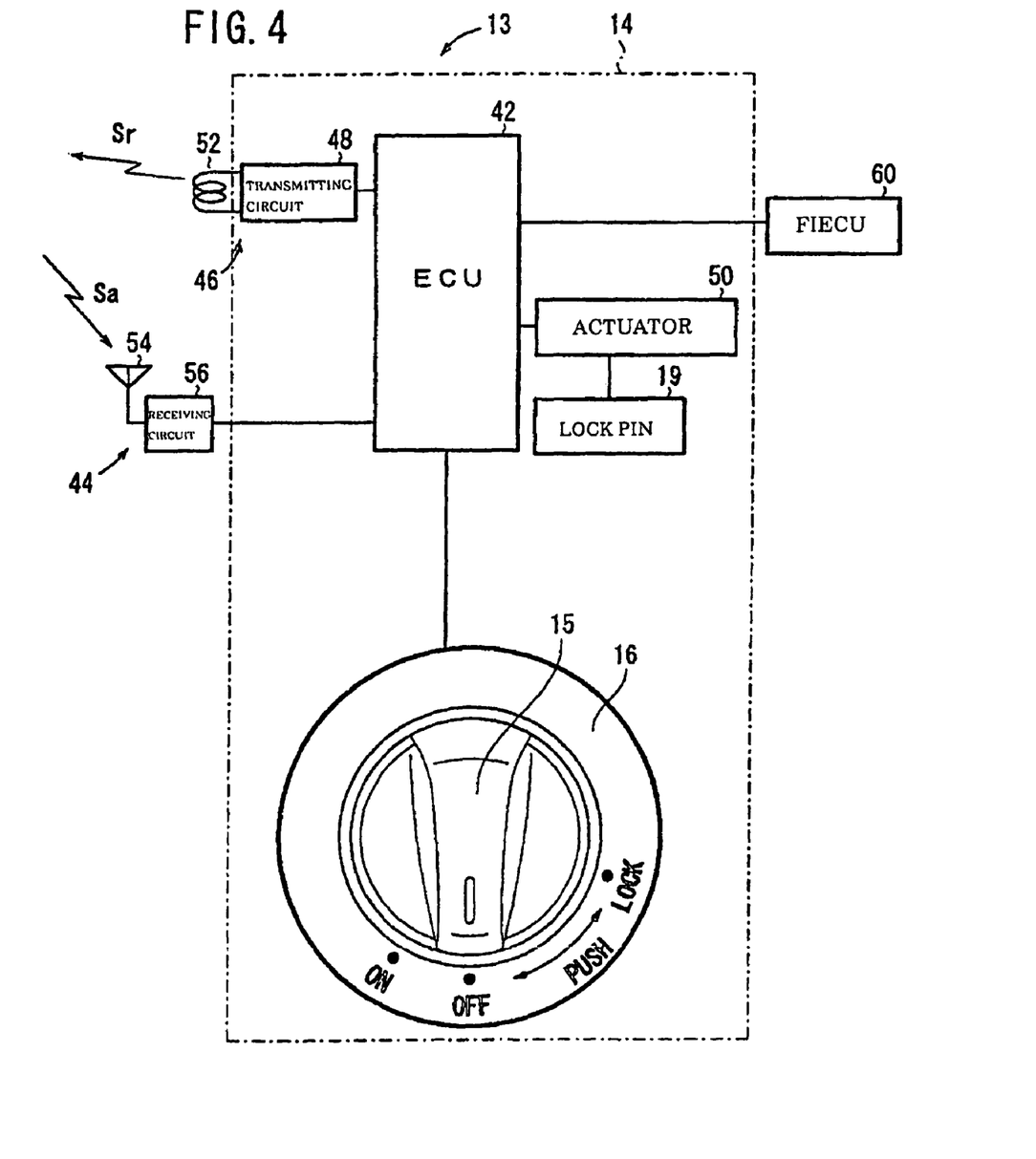
FIG. 4 is a block diagram showing a configuration of a vehicle-mounted device.

FIG. 4 shows a block diagram of the vehicle-mounted device 13 including the handle lock module 14. The ECU 42 of the handle lock module 14 includes a system LSI, for example.

The handle lock module 14 includes the ECU 42, a transmitting circuit 48 constituting a transmitting unit 46 for transmitting the request signal Sr, the actuator 50 for reciprocating the lock pin 19 and the main switch 16 provided with the main switch knob 15.

The LF transmitting antenna 52 constituting the transmitting unit 46 is connected to the transmitting circuit 48.

In addition, the UHF receiving unit 44 including the UHF receiving antenna 54 and a receiving circuit 56, and a fuel-injection controlling ECU (FIECU) 60 are connected to the handle lock module 14.

The main switch knob 15 which is a knob for switching the main switch 16 connected to the ECU 42 can be switched in turn among the following positions a LOCK position which causes the rotation shaft of the handlebar 102 to be locked via the lock pin 19, a PUSH position which causes two-way authentication communication with the portable device 12 when the main switch knob 15 is pushed at the LOCK position, an OFF position which causes the engine to stop and can be reached when the portable device 12 is authenticated and an ON position which causes power to be supplied from the vehicle-mounted battery to the FIECU 60, and causes the engine to start by the operation of the starting switch not shown, and which is the position selected while the engine is operating.

The receiving circuit 56 receives, via the UHF receiving antenna 54, the answer signal Sa transmitted from the portable device 12, and demodulates the signal. The demodulated answer signal Sa is provided to the ECU 42.

The vehicle electronic key system 10 according to this embodiment is constructed basically in the above-described manner. Next, a description will be provided of an operation thereof, divided into the descriptions of (1) an operation performed in the case of normal communication with no radio noise, and (2) an operation performed while radio noise occurs.

Operation performed in the case of normal communication with no radio noise

In the case where a user rides on the vehicle 100 while the vehicle 100 is parked or stopped, for example, when the user comes close to the vehicle 100, carrying the portable device 12, and performs a pushing operation of the main switch knob 15 at the LOCK position, the ECU 42 reads out request data from the ROM at predetermined intervals, and outputs the data to the transmitting unit 46. The transmitting unit 46 modulates a carrier wave according to the request data Dr provided from the ECU 42, and transmits the data as the request signal Sr via the LF transmitting antenna 52 in the form of radio waves.

Once the radio waves of the request signal Sr are received and demodulated by the receiving circuit 26 of the portable device 12 which circuit is in the high sensitivity state, the CPU 24 is activated, that is, "wakes up." At this time, the CPU 24 verifies the demodulated request signal Sr, and, if the signal is the request signal Sr, the CPU 24 outputs, as the transmission data Dt, the ID data read out of the ROM to the UHF transmitting circuit 28.

The UHF transmitting circuit 28 transmits the answer signal Sa including the ID of the portable device 12 from the transmitting antenna 29 in the form of radio waves.

Once the radio waves of the answer signal Sa are received by the receiving antenna 54 of the receiving unit 44 of the vehicle-mounted device 13, and demodulated by the receiving circuit 56, the ECU 42 verifies whether the signal provided from the receiving unit 44 is the answer signal Sa, and, if it is determined that the signal is the answer signal Sa, the ECU 42 further verifies whether the ID data included in the answer signal Sa matches the ID data stored in its ROM.

If it is determined that both ID data match with each other, mutual authentication between the ECU 42 and the portable device 12 is completed, and the main switch knob 15 is unlocked (set in a turnable state).

Once the main switch knob 15 is unlocked, a knob-unlock indicator lamp (also referred to as a SMART indicator lamp) provided in a meter not shown, and the periphery of the main switch knob 15 are illuminated with a blue illumination.

Actually, the ECU 42, as described above, outputs the request data Dr when the main switch knob 15 is pushed at the LOCK position, and, if the answer signal Sa comes within a predetermined period of time from the time point when the request data Dr is outputted, and the ID authentication is carried out, the ECU 42 unlocks the main switch knob 15, and, at the same time, outputs an unlock signal to the actuator 50 constituting the handle lock mechanism 17. The actuator 50 having received the unlock signal moves the lock pin 19 so as to be retracted into the body. Thus, the rotation shaft of the handlebar 102 is unlocked.

In this state, the main switch knob 15 is at the OFF position. When the main switch knob 15 is turned to the ON position, power is supplied to the FIECU 60, and an engine-ignition permission ID data read out of its ROM is transmitted to the FIECU 60. At this time, if mutual authentication between the ECU 42 and the FIECU 60 is completed, the state is brought about in which the engine can be started. That is, when a start signal from the starting switch not shown is received, the engine is started, and the state is brought about in which the vehicle can be operated.

Next, when the user gets off the vehicle, once the main switch knob 15 is returned from the ON position to the OFF position, the engine stops simultaneously. It should be noted that, after the main switch knob 15 is returned to the OFF position, the portable device 12 and the handle lock module 14 perform communication at intervals of one second, and, while the mutual authentication is established, the main switch knob 15 is kept unlocked. When the user goes 2.5 m or more away from the vehicle 100, the main switch knob 15 is returned to the LOCK position, and the locked state is brought about. At the same time, the actuator 50 also operates, setting the lock pin 19 at a projecting position, so that the rotation shaft of the handlebar 102 is locked. At this time, actually, the blinkers flash to provide notification, as a so-called answer-back, to the user. Even if the portable device 12 is within 2.5 m of the vehicle, the lock operation is carried out when the portable device 12 is left without any operation for 20 s or more, for example.

Operation performed while radio noise occurs.

There is a case where the knob-unlock indicator lamp provided in a meter not shown, and the periphery of the main switch knob 15 do not illuminate with a blue illumination, and the handle lock mechanism 17 is not unlocked, even if the user comes close to the vehicle 100, carrying the portable device 12, and performs a pushing operation of the main switch knob 15 at the LOCK position when the user rides on the vehicle 100 while the vehicle 100 is parked or stopped.

In this case, if the CPU 24 of the portable device 12 detects that the portable device 12 is activated successively for a certain period of time, that is, 1 to 10 s for example, the CPU 24 determines that the situation is such that it is impossible to receive the request signal Sr due to external, continuous radio noise and the like, and, as a result, allows the LED 32 to provide a blinking indication in red for a predetermined period of time via the LED drive circuit 30. The LED 32 which provides a blinking indication in red for a predetermined period of time serves as the reception impossible state indicator. On the other hand, the CPU 24 which determines whether the situation is such that it is impossible to receive the request, serves as the reception possibility determination means.

Figure 5:
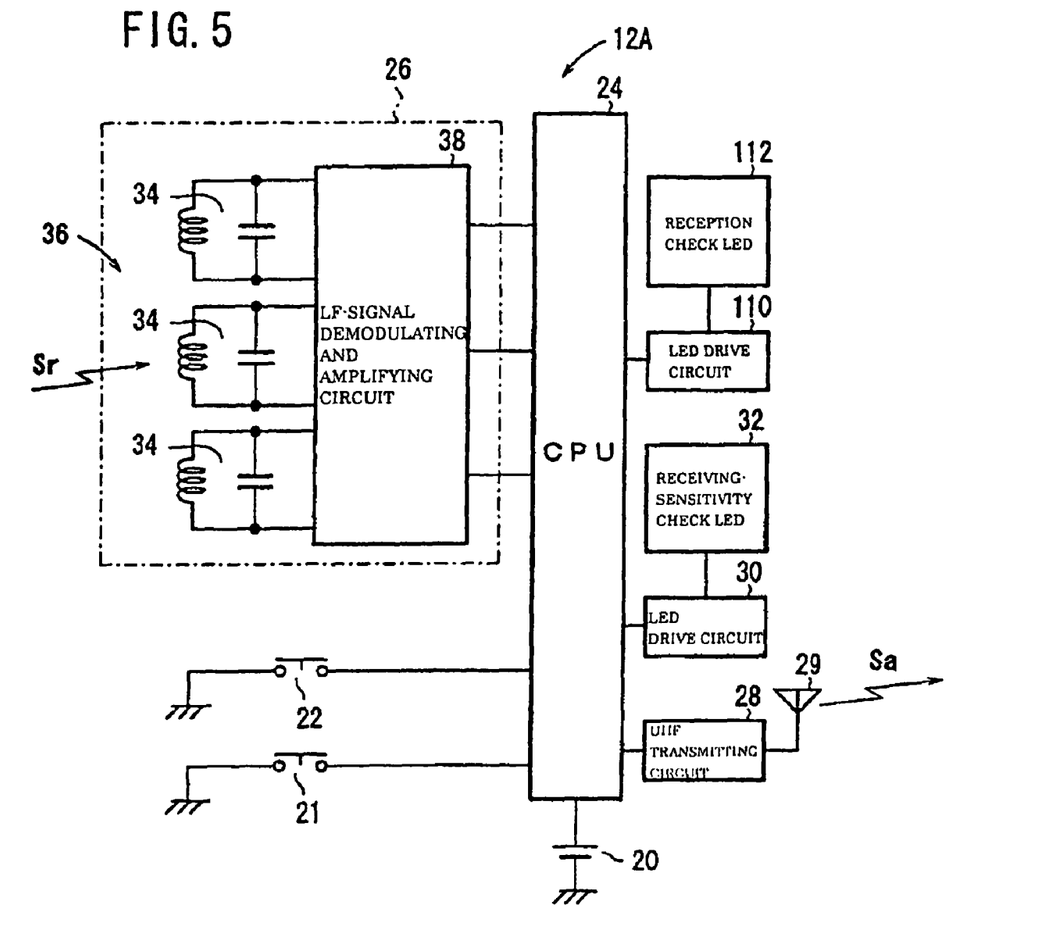
FIG. 5 is a block diagram showing another configuration of the portable device.

As shown in FIG. 5, the portable device 12 may be replaced by a portable device 12A provided with another LED drive circuit 110 and another reception check LED 112 which, when the situation is such that it is impossible to receive the request signal Sr, are used to provide a blinking indication of this situation.

In the case of either the portable device 12 or the portable device 12A, in order to save power consumption of the battery 20, the duty ratio of the blinking indication is 50% or less in terms of time.

In order to avoid complication, basically, a description will be given below of the portable device 12 by way of example. From the blinking indication in red of the LED 32 (for example, shown in FIG. 3) corresponding to the function of providing notification concerning the reception impossible state, the user determines that the mutual communication between the portable device 12 and the vehicle-mounted device 13 is not being performed. Thus, the user performs the long pushing of the receiving-sensitivity changing switch 22 of the portable device 12, and brings the portable device 12 physically close to the main switch knob 15.

Since the gain of the LF-signal demodulating and amplifying circuit 38 is made small under the control of the CPU 24 in this case, the level of the noise signal relating to the external, continuous radio noise processed in the LF-signal demodulating and amplifying circuit 38 becomes low, and the level of the request signal S relating to the authorized radio waves becomes relatively large, so that the signal to noise ratio becomes large. Accordingly, the probability that the request signal Sr can be normally demodulated becomes high.

If the request signal Sr is normally received, and the authentication between the portable device 12 and the vehicle-mounted device 13 is then carried out, the main switch knob 15 (the main switch 16) is unlocked.

In this way, with the embodiment described above, it is made possible to perform authentication between the portable device 12 and the vehicle-mounted device 13 on the basis of the request signal that is an authorized radio signal even under a bad radio environment in which radio noise comes continuously. As a result, it is possible to unlock the main switch knob 15 to turn the main switch knob 15 to the ON position that is the engine startable position.

In the above-described example, the receiving sensitivity of the receiving circuit 26 is changed between two levels, high and low. However, it is preferable that the receiving sensitivity be changed among multiple levels, such as three levels, because the capability for the authentication is improved. The sensitivity may also be changed steplessly.

Figure 6:
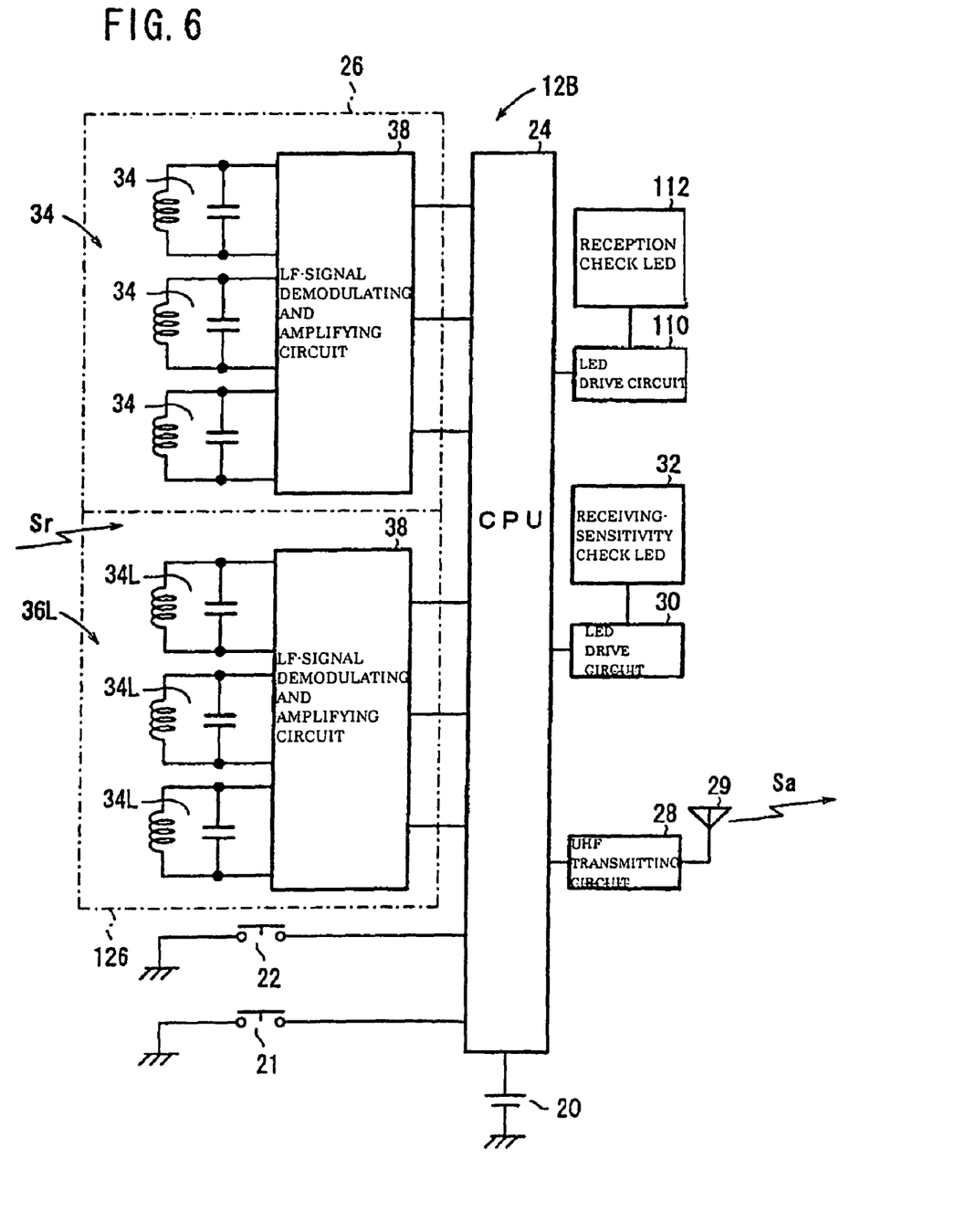
FIG. 6 is a block diagram showing still another configuration of the portable device.

FIG. 6 is a block diagram of a portable device 12B into which another construction having the function of changing the receiving sensitivity of the receiving circuit is incorporated.

In the portable device 12B of the example shown in FIG. 6, a receiving circuit 26 with high sensitivity and a receiving circuit 126 with low sensitivity (a low-sensitivity receiving circuit) are connected in parallel. In LC tuning circuits 34L constituting an LF receiving antenna 36L of the low sensitivity receiving circuit 126, the number of turns of the coils are set small to set the inductance L small. In addition, the value of the capacitance C is changed so as to match the tuning frequencies.

Also in the portable device 12B of the example shown in FIG. 6, if the reception check LED 112 provides a blinking indication in red when the main switch knob 15 is pushed, by performing the long pushing of the receiving-sensitivity changing switch 22, the high-sensitivity receiving circuit 26 which is set in an operating state in the default setting is set in a non-operating state (a no-power supplied state), and the low sensitivity receiving circuit 126 is set in an operating state (a power supplied state), so that the state is changed from a high sensitivity reception state to a low sensitivity reception state.

In this case, although both of the external, continuous noise and the request signal Sr which are supplied from the LF receiving antenna 36L to the LF-signal demodulating and amplifying circuit 38 of the low sensitivity receiving circuit 126 come to have small values, the level of the request signal Sr relating to the authorized radio waves is made relatively large by bringing the portable device 12 close to the main switch knob 15, so that the signal to noise ratio becomes large. Accordingly, the probability that the request signal Sr can be normally demodulated becomes higher than that in the case of the portable device 12 of the example shown in FIG. 3.

As described above, the CPU 24 (the receiving-sensitivity changing control means) of each of the portable devices 12, 12A and 12B each constituting the above-described vehicle electronic key system 10 is constructed so as to be able to change the receiving sensitivity by changing the gain of the receiving circuit 26, or by switching between the high sensitivity receiving circuit 26 and the low sensitivity receiving circuit 126, according to the operation of the receiving-sensitivity changing switch 22.

As a result, even if the authentication cannot be carried out with the normal receiving sensitivity due to the influence of the continuous radio noise, by performing the long pushing of the receiving-sensitivity changing switch 22 to thereby change the receiving sensitivity of the portable device 12 to the low sensitivity, and by bringing the portable device 12 physically close to the LF transmitting antenna 52 which is the transmission source of the request signal, the signal to noise ratio is increased. Accordingly, the probability that the authentication based on the request signal Sr can be carried out increases dramatically.

In other words, with this embodiment, it is made possible to ensure a perform authentication between the portable device 12 and the vehicle-mounted device 13 on the basis of the request signal Sr which is the authorized radio signal even under bad radio environment in which radio noise comes continuously.

Needless to say, the present invention is not limited to the above-described embodiment, and various constructions can be employed without departing from the main point of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle electronic key system having a vehicle-mounted device, and a portable device for receiving a request signal transmitted from the vehicle-mounted device and for transmitting an answer signal, the portable device comprising:

a receiving circuit for receiving the request signal;

a single receiving-sensitivity changing switch;

a receiving-sensitivity indicator for indicating receiving sensitivity of the receiving circuit; and receiving-sensitivity changing control means for displaying receiving sensitivity of the receiving circuit on the receiving-sensitivity indicator, and for changing the receiving sensitivity of the receiving circuit on the basis of operation of the single receiving-sensitivity changing switch, wherein the receiving sensitivity of the receiving circuit is normally in a high sensitivity state, the high sensitivity state being a default state, wherein when the receiving sensitivity is the high sensitivity state, and the single receiving-sensitivity changing switch is operated for shorter than a predetermined period of time, the receiving sensitivity remains unchanged and the receiving-sensitivity indicator indicates the high receiving sensitivity by exhibiting a first color, whereas when the single receiving-sensitivity changing switch is operated for longer than the predetermined period of time the receiving sensitivity is changed to a sensitivity state that is lower than the high sensitivity state, thereby reducing an influence of signals from sources other than vehicle-mounted device, and the receiving-sensitivity indicator indicates the low receiving sensitivity by exhibiting a second color, and wherein when the receiving sensitivity is the low sensitivity state, and the single receiving-sensitivity changing switch is operated for shorter than the predetermined period of time, the receiving sensitivity remains unchanged and the receiving-sensitivity indicator indicates the low receiving sensitivity by exhibiting the second color, whereas when the receiving sensitivity of the receiving circuit is the lower sensitivity state, and the single receiving-sensitivity changing switch is operated for longer than the predetermined period of time, the receiving sensitivity is changed from the lower sensitivity state to the high sensitivity state, and the receiving-sensitivity indicator indicates the high receiving sensitivity by exhibiting the first color.

2. The vehicle electronic key system according to claim 1, wherein the receiving-sensitivity changing control means changes the receiving sensitivity of the receiving circuit stepwise among the high sensitivity state and one or more sensitivity states that are lower than the high sensitivity state.

3. The vehicle electronic key system according to claim 1, wherein the receiving circuit includes a low sensitivity receiving circuit and a high sensitivity receiving circuit, and the receiving-sensitivity changing control means changes the receiving sensitivity by switching between the low sensitivity receiving circuit and the high sensitivity receiving circuit, wherein each of the low sensitivity receiving circuit and the high sensitivity receiving circuit includes an XYZ, three-axis receiving antenna formed of LC tuning circuits.

4. The vehicle electronic key system according to claim 1, wherein the portable device further comprises an on/off switch located adjacent to the receiving-sensitivity changing switch and the receiving-sensitivity indicator.

5. A vehicle electronic key system having a vehicle-mounted device, and a portable device for receiving a request signal transmitted from the vehicle-mounted device and for transmitting an answer signal, the portable device comprising:

a receiving circuit for receiving the request signal;
a single receiving-sensitivity changing switch; and receiving-sensitivity changing control means for changing receiving sensitivity of the receiving circuit on the basis of operation of the single receiving-sensitivity changing switch, wherein the receiving sensitivity of the receiving circuit is normally in a high sensitivity state, and in order to improve authentication between the portable device and the vehicle-mounted device, the single receiving-sensitivity changing switch is operated for longer than a predetermined period of time which changes the receiving sensitivity to a sensitivity state that is lower than the high sensitivity state, thereby reducing an influence of signals from sources other than vehicle-mounted device, and when the receiving sensitivity of the receiving circuit is the lower sensitivity state., and the single receiving-sensitivity changing switch is operated for longer than the predetermined period of time, the receiving sensitivity is changed from the lower sensitivity state to the high sensitivity state, the high sensitivity state being a default state, wherein the portable device further comprises an LED which exhibits a first color when the current receiving sensitivity of the receiving circuit is the lower sensitivity state and the receiving-sensitivity changing switch is operated for less than the predetermined period of time, and exhibits a second color when the receiving sensitivity of the receiving circuit is the high sensitivity state and the receiving-sensitivity changing switch is operated for less than the predetermined period of time, wherein the LED changes between the first the second colors only when the single receiving-sensitivity changing switch is operated for longer than the predetermined period of time.

6. The vehicle electronic key system according to claim 1, wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation.

7. The vehicle electronic key system according to claim 2, wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation.

8. The vehicle electronic key system according to claim 1, wherein the receiving sensitivity of the receiving circuit is changeable from the high sensitivity state to the lower sensitivity state by a single operation consisting of pressing the single receiving-sensitivity changing switch for longer than the predetermined period of time.

9. The vehicle electronic key system according to claim 1 wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation, wherein the reception impossible state indicator is a reception check LED which exhibits a blinking light when the reception possibility determination means determines that the situation is such that it is impossible to receive the request signal.

10. The vehicle electronic key system according to claim 1, wherein the receiving circuit includes a low sensitivity receiving circuit and a high sensitivity receiving circuit are connected in parallel, and the receiving-sensitivity changing control means changes the receiving sensitivity by switching between the low sensitivity receiving circuit and the high sensitivity receiving circuit.

11. A vehicle electronic key system having a vehicle-mounted device, and a portable device for receiving a request signal transmitted from the vehicle-mounted device and for transmitting an answer signal, the portable device comprising:

a receiving circuit for receiving the request signal, said receiving circuit includes an antenna and a signal demodulating and amplifying circuit;

a receiving-sensitivity indicator for indicating receiving sensitivity of the receiving circuit:

a single receiving-sensitivity changing switch; and receiving-sensitivity changing control means adapted to display receiving sensitivity of the receiving circuit on the receiving-sensitivity indicator, and to change the receiving sensitivity of the receiving circuit only when the single receiving-sensitivity changing switch is operated for a longer period of time than the predetermined period of time, wherein the receiving-sensitivity changing control means is adapted to not change the receiving sensitivity of the receiving circuit when the receiving-sensitivity changing switch is operated for any period of time that is a shorter period of time than the predetermined period of time, wherein the shorter period of time is any period of time greater than zero and less than the predetermined period of time, wherein the receiving sensitivity of the receiving circuit is normally in a high sensitivity state, and wherein when the receiving sensitivity is the high sensitivity state, and the single receiving-sensitivity changing switch is operated for shorter than the predetermined period of time, the receiving sensitivity remains unchanged and the receiving-sensitivity indicator indicates the high receiving sensitivity by exhibiting a first color, whereas when the single receiving-sensitivity changing switch is operated for longer than a predetermined period of time, the receiving sensitivity is changed to a sensitivity state that is lower than the high sensitivity state, thereby reducing an influence of signals from sources other than vehicle-mounted device, and the receiving-sensitivity indicator indicates the low receiving sensitivity by exhibiting a second color, and wherein when the receiving sensitivity is the low sensitivity state, and the single receiving-sensitivity changing switch is operated for shorter than a predetermined period of time, the receiving sensitivity remains unchanged and the receiving-sensitivity indicator indicates the low receiving sensitivity by exhibiting the second color, whereas when the receiving sensitivity of the receiving circuit is the lower sensitivity state, and the single receiving-sensitivity changing switch is operated for longer than the predetermined period of time, the receiving sensitivity is changed from the lower sensitivity state to the high sensitivity state, and the receiving-sensitivity indicator indicates the high receiving sensitivity by exhibiting the first color.

12. The vehicle electronic key system according to claim 11, wherein the receiving-sensitivity changing control means changes the receiving sensitivity of the receiving circuit stepwise among the high sensitivity state and one or more sensitivity states that are lower than the high sensitivity state.

13. The vehicle electronic key system according to claim 11, wherein the receiving circuit includes a low sensitivity receiving circuit and a high sensitivity receiving circuit, and the receiving-sensitivity changing control means changes the receiving sensitivity by switching between the low sensitivity receiving circuit and the high sensitivity receiving circuit, wherein the antenna is an XYZ, three-axis receiving antenna formed of LC tuning circuits.

14. The vehicle electronic key system according to claim 11, wherein the receiving-sensitivity changing control means includes a portion which is connected to ground when the receiving-sensitivity changing switch is operated, and which is disconnected from the ground when the receiving-sensitivity changing switch is not operated.

15. The vehicle electronic key system according to claim 11, wherein the receiving-sensitivity indicator is an LED, and wherein the LED changes between the first the second colors only when the single receiving-sensitivity changing switch is operated for longer than the predetermined period of time.

16. The vehicle electronic key system according to claim 11, wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation.

17. The vehicle electronic key system according to claim 12, wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation.

18. The vehicle electronic key system according to claim 11, wherein the receiving sensitivity of the receiving circuit is changeable from the high sensitivity state to the lower sensitivity state by a single operation consisting of pressing the single receiving-sensitivity changing switch for longer than the predetermined period of time.

19. The vehicle electronic key system according to claim 11, wherein the portable device further comprises:

reception possibility determination means for determining, from an output signal of the receiving circuit, whether the situation is such that it is impossible to receive the request signal; and a reception impossible state indicator which, when the reception possibility determination means determines that the situation is such that it is impossible to receive the request signal, indicates this situation, wherein the reception impossible state indicator is a reception check LED which exhibits a blinking light when the reception possibility determination means determines that the situation is such that it is impossible to receive the request signal.

20. The vehicle electronic key system according to claim 11, wherein the receiving circuit includes a low sensitivity receiving circuit and a high sensitivity receiving circuit are connected in parallel, and
the receiving-sensitivity changing control means changes the receiving sensitivity by switching between the low sensitivity receiving circuit and the high sensitivity receiving circuit.

* * * * *